United States Patent
Tokunaga

(10) Patent No.: US 7,876,091 B2
(45) Date of Patent: Jan. 25, 2011

(54) MAGNETIC ENCODER

(75) Inventor: Ichiro Tokunaga, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 352 days.

(21) Appl. No.: 12/181,723

(22) Filed: Jul. 29, 2008

(65) Prior Publication Data

US 2009/0001970 A1 Jan. 1, 2009

(30) Foreign Application Priority Data

| Jan. 30, 2006 | (JP) | ............................. 2006-020366 |
| Jan. 29, 2007 | (WO) | ................. PCT/JP2007/051348 |

(51) Int. Cl.
*G01R 33/06* (2006.01)
(52) U.S. Cl. ........................... 324/207.21; 324/207.25; 324/252
(58) Field of Classification Search ............ 324/207.21, 324/207.25, 252
See application file for complete search history.

(56) References Cited

U.S. PATENT DOCUMENTS

| 4,845,456 A | * | 7/1989 | Abe et al. ................. 338/32 R |
| 6,452,382 B1 | | 9/2002 | Tokunaga et al. |
| 2003/0137381 A1 | | 7/2003 | Toyoda et al. |

FOREIGN PATENT DOCUMENTS

JP 59-146720 10/1984

OTHER PUBLICATIONS

International Search Report Issued in corresponding PCT Application No. PCT/JP2007/051348; mailed Apr. 3, 2007.

* cited by examiner

*Primary Examiner*—Reena Aurora
(74) *Attorney, Agent, or Firm*—Brinks Hofer Gilson & Lione

(57) ABSTRACT

A magnetic encoder is provided, in which a large output voltage (a large amplitude) is obtained so that the magnetic encoder can have a strong resistance to external noise and so that malfunction can be prevented.

Each of first to fourth magnetoresistance elements A1, A2, A3, and A4 has at least a pinned layer, and a free layer in which an internal magnetization direction changes in accordance with external magnetic fields emitted by a magnetic body 11. A magnetization direction $\alpha$ of the pinned layer is set to be in a first direction (a direction Z2) that is parallel to an outer peripheral side surface 11A and that is perpendicular to rotation directions ra1-ra2, or is set to be in a second direction (a direction Z1) that is opposite to the first direction. Additionally, an initial magnetization direction $\beta$ of the free layer is set to be in the first direction (the direction Z2) or the second direction (the direction Z1). When a pitch of N and S poles adjacent to one another in the rotation direction is denoted by $\lambda$, a pitch of the magnetoresistance elements A1, A2, A3, and A4 is set to a pitch of $\lambda/2$.

3 Claims, 8 Drawing Sheets

MAGNETIC ENCODER

TECHNICAL FIELD

The present invention relates to a non-contact-type magnetic encoder, and, more particularly, to a magnetic encoder in which magnetoresistance elements are used.

BACKGROUND ART

A magnetic encoder in the related art includes a magnetic body that is provided so as to be rotatable with a rotation shaft and that is formed in the shape of a disk, and a pair of Hall elements that is disposed in the vicinity of an outer peripheral surface of the magnetic body. On an outer peripheral side surface 11A of the magnetic body, a magnetic code is formed, in which N poles and S poles are alternately polarized. The pair of Hall elements detects magnetic fields generated by the magnetic code, and outputs pulse signals to an external unit. An A-phase pulse signal is output from one of the Hall elements. A B-phase pulse signal whose phase is 90 degrees different from that of the A-phase pulse signal is output from the other Hall element. By using the pulse signals, a rotation direction of the rotation shaft or the number of rotations can be detected (for example, Patent Document 1).

Patent Document 1: Japanese Unexamined Patent Application Publication No. 9-243399

DISCLOSURE OF INVENTION

Problems to be Solved by Invention

However, in a magnetic encoder in which Hall elements are used, such as a magnetic encoder described in Patent Document 1, output voltages (amplitudes) of the Hall elements are small voltages of the order of 10 mV. Because of the small output voltages, there is a problem that malfunction occurs due to interference of small external noise.

It is known that an output voltage V of a Hall element is defined by the equation $V = R_H \cdot I \cdot B / d$, wherein a Hall coefficient is denoted by $R_H$, the thickness of the Hall element is denoted by d, a current is denoted by I, a magnetic flux density of an external magnetic field is denoted by B. The hole coefficient $R_H$ and the thickness d are fixed elements that are predetermined by the characteristics of a selected Hall element. Accordingly, in a detection circuit of the magnetic encoder that is used in reality, in order to have a strong resistance to external noise and to ensure a stable operation, it is desirable that the output voltage V be increased. In order to increase the output voltage V, it is necessary that the current I and/or the magnetic flux density B be increased. However, when a method for increasing the current I is used, the power consumption of the magnetic encoder is increased. Additionally, when a method for increasing the magnetic flux density B is used, it is necessary that the size of a magnet that forms the external field be increased. Alternatively, it is necessary to employ a rare-earth magnet (for example, a neodymium magnet) whose maximum energy product is large. In the first case, there are a problem that the size of the magnetic encoder is increased, and, in the second case, there is a problem that the cost is largely increased The present invention is an invention to solve the problems in the related art. It is an object of the present invention to provide a magnetic encoder in which a large output voltage (a large amplitude) is obtained although the size of the magnetic encoder is small, so that the magnetic encoder can have a strong resistance to external noise and so that malfunction can be prevented.

Means for Solving Problems

A magnetic encoder according to the present invention includes a rotation body that is rotatably supported, a magnetic body including a plurality of magnetic poles that are alternately polarized as N poles and S poles along a rotation direction on an outer peripheral side surface of the rotation body, and a plurality of magnetoresistance elements that are disposed along the rotation direction in the vicinity of the magnetic body so as to face the magnetic body. Each of the plurality of magnetoresistance elements includes at least a pinned layer, and a free layer in which an internal magnetization direction changes in accordance with external magnetic fields emitted by the magnetic body. A magnetization direction of the pinned layer is set to be in the rotation direction, and an initial magnetization direction of the free layer is set to be in a direction that is parallel to the outer peripheral side surface and that is perpendicular to the rotation direction. A pitch of the N poles and the S poles that are adjacent to one another in the rotation direction and an arrangement pitch of the plurality of magnetoresistance elements are set to the same pitch.

In the present invention, when the magnetic body is rotated, the magnetization directions of the free layers that are provided in the magnetoresistance elements can be changed by substantially 180 degrees. Accordingly, total resistances of the magnetoresistance elements can be largely changed over an entire range of the minimum value to the maximum value.

In the description given above, it is preferable that each of the plurality of magnetoresistance elements include, in addition to the pinned layer and the free layer, an antiferromagnetic layer that pins the magnetization direction of the pinned layer in a predetermined direction, and a hard bias layer that provides a bias magnetic field which sets the initial magnetization direction of the free layer to be in a reference direction.

In the above-described configuration, in a case of zero magnetic field, the resistances of the magnetoresistance elements can be prevented from becoming undefined values, and can be set to a certain value. Thus, appropriate detection signals can be always output, and an operation of the magnetic encode can be stabilized.

Additionally, it is preferable that a detection section be provided, the detection section including, when the pitch of the plurality of magnetic poles is denoted by λ, four magnetoresistance elements, namely, first to fourth magnetoresistance elements, that are disposed in such a manner that the arrangement pitch is λ, a first connection unit that is used to connect two magnetoresistance elements which are the first and fourth magnetoresistance elements in series, a second connection unit that is used to connect two magnetoresistance elements which are the second and third magnetoresistance elements in series, and a power supply that applies a predetermined voltage between ends of the first and second magnetoresistance elements and ends of the third and fourth magnetoresistance elements, a first detection voltage being output from the first connection unit, a second detection voltage being output from the second connection unit.

In the above-described means, a division ratio of resistances in a bridge circuit configured using the four magnetoresistance elements can be fully changed over a range of the minimum division ratio to the maximum division ratio. Thus, the maximum amplitudes (the full swings) of a first detection voltage V1 and a second detection voltage V2, which are output from a first connection unit T1 and a second connection unit T2, respectively, can be obtained.

It is preferable that, in contrast to the first detection section configured using the first to fourth magnetoresistance elements which are disposed using the arrangement pitch of λ, a second detection section be provided, the second detection section being configured using fifth to eighth magnetoresistance elements that are disposed using the arrangement pitch of λ which is used for the first to fourth magnetoresistance elements. It is also preferable that each of the magnetoresistance elements which are the fifth to eighth magnetoresistance elements be disposed between corresponding ones of the magnetoresistance elements which are the first to fourth magnetoresistance elements, and that a distance of the magnetoresistance elements adjacent to one another be set to a pitch of λ/2.

In the above-described means, four types of signals, namely, an A-phase signal, a B-phase signal, an A-phase-bar signal, and a B-phase-bar signal, which have large amplitudes and a phase difference.

ADVANTAGES OF INVENTION

In the magnetic encoder according to the present invention, the magnetoresistance elements can be operated in such a manner that the resistances thereof range from the substantially maximum resistance to the substantially minimum resistance. Accordingly, the amplitudes of the detection signals can be fully changed from the minimum value to the maximum value. Thus, the magnetic encoder having a strong resistance to external noise can be provided.

BEST MODES FOR CARRYING OUT THE INVENTION

FIG. 1 is a plan view of a magnetic encoder according to an embodiment of the present invention. FIG. 2 is a sectional view of the magnetic encoder shown in FIG. 1. FIG. 3 is a schematic sectional view of a basic configuration of a multi-layer magnetoresistance element. FIG. 4 is a partially enlarged plan view of a magnetic code formed on an outer peripheral side surface of a magnetic body. FIG. 5 is a plan view of a sensor board on which magnetoresistance elements are formed. In FIG. 4, for simplicity, the magnetic code is shown in a state in which a circle arrangement of the magnetic code is converted to an equivalent linear arrangement.

A magnetic encoder 10 shown in FIGS. 1 and 2 is an apparatus that detects, for example, a rotation angle, a rotation direction, a rotation velocity, and so forth. In the magnetic encoder 10, a magnetic body 11, a rotation body 12 by which the magnetic body 11 is rotatably supported, and a sensor board 20 on which magnetoresistance elements are formed are mainly provided.

The magnetic body 11 is substantially formed in the shape of a ring. The inner surface of the magnetic body 11 is fixed on an outer peripheral side surface 12b of the rotation body 12 that is formed in the shape of a disk. On an outer peripheral side surface 11A of the magnetic body 11, the magnetic code is formed, in which a plurality of magnetic poles, which are N poles and S poles, that are alternately polarized. In the description given below, when the magnetic code is shown in the state in which the arrangement of the magnetic code is converted to the linear arrangement, a pitch of the magnetic poles, which is a distance of the N and S poles that are adjacent to one another, is denoted by λ (see FIG. 4 and so forth).

The magnetic body 11 and the rotation body 12 are disposed in a recessed portion 9A that is provided in a housing 9 and that is formed in the shape of a circle. A central hole 9a is formed at the center of the housing 9. A rotation shaft 12a, which is formed at the center of the rotation body 12, passes through the central hole 9a. The magnetic body 11 is supported so as to rotate about the rotation shaft 12a of the rotation body 12 in rotation directions ra1 and ra2 in the recessed portion 9A.

In the housing 9, a cut portion 9b is formed by cutting out a portion of the recessed portion 9A in an outer peripheral direction. The sensor board 20 is fixed in the cut portion 9b so as to face the outer peripheral side surface 11A of the magnetic body 11. On the sensor board 20, a plurality of magnetoresistance elements A (individually denoted by A1, A2, A3, and A4) are provided.

As shown in FIG. 3, regarding the basic configuration of the magnetoresistance elements A, each of the magnetoresistance elements A includes an antiferromagnetic layer (an exchange bias layer) 21 that is provided as the bottom layer, a pinned layer (a fixed layer) 22 that is stacked on the top of the antiferromagnetic layer 21, a non-magnetic layer 23 that is stacked on the top of the pinned layer 22, a free layer 24 that is provided as the top layer, hard bias layers 25a and 25b that are provided at both sides of the layers given above, and terminal units 26 that are provided on the top of the hard bias layers 25a and 25b.

The antiferromagnetic layer 21 pins a magnetization direction α of the pinned layer 22 in a predetermined direction (the rotation direction ra1 in FIG. 3). The hard bias layers 25a and 25b are formed of, for example, permanent magnets. In FIG. 3, the hard bias layers 25a and 25b provide a bias magnetic field γ to orient an initial magnetization direction β0 of the free layer 24 in a predetermined reference direction (a first direction (a direction Z2) in FIG. 3) which is perpendicular to a predetermined direction (the rotation direction ra1). Accordingly, when no external magnetic field influences the magnetoresistance element A, a magnetization direction β of the free layer 24 is aligned in a direction (the first direction (the direction Z2) in FIG. 3) the same as that of the bias magnetic field γ. The initial magnetization direction β0 of the free layer 24 is the magnetization direction β of the entire free layer 24 in a state (zero magnetic field) in which an external magnetic field is zero.

The magnetization direction β of the free layer 24 is changes in accordance with a vector sum of external magnetic fields (in the present invention, magnetic fields which are generated by the magnetic code provided on the magnetic body 11) that influence the free layer 24, and the bias magnetic field γ. A total resistance of the magnetoresistance element A described in this embodiment becomes the minimum value when the magnetization direction β of the free layer 24 is oriented in the rotation direction ra1 so that the magnetization direction β of the free layer 24 and the magnetization direction α of the pinned layer 22 are oriented in the same direction (a relationship in which the difference is zero degrees). In contrast, the total resistance of the magnetoresistance element A becomes the maximum value when the magnetization direction β of the free layer 24 is oriented in the rotation direction ra2 so that the magnetization direction β of the free layer 24 and the magnetization direction a of the pinned layer 22 are oriented in directions opposite to each other. Additionally, when the angle between the magnetization direction β of the free layer 24 and the magnetization direction a of the pinned layer 22 becomes a right angle (90 degrees), i.e., when the magnetization direction β of the free layer 24 is oriented in the first direction (the direction Z2) or in a second direction (a direction Z1), the total resistance of the magnetoresistance element A becomes the medium value.

The total resistance of each of the magnetoresistance elements A is denoted by Z. A fixed resistance of the magnetoresistance element A is denoted by R. A variation width of a variable resistance of the magnetoresistance element A is denoted by Δr. The minimum value of the total resistance Z can be defined by the equation Zmin=R. The maximum value of the total resistance Z can be defined by the equation Zmax=R+Δr. The medium value of the total resistance Z can be defined by the equation Zmid=(Zmin+Zmax)/2=R+Δr/2.

As shown in FIG. 5, on the sensor board 20, first to fourth magnetoresistance elements, namely, four magnetoresistance elements A1, A2, A3, and A4, are provided along the rotation direction (ra1 or ra2).

The magnetization directions α of the pinned layers 22 of the first to fourth magnetoresistance elements A1, A2, A3, and A4 according to the embodiment are oriented in the rotation direction (ra1 in FIG. 5). In contrast, the initial magnetization directions β0 of the corresponding free layers 24 are oriented in the first direction (the direction Z2), which is perpendicular to the rotation directions (ra1-ra2). Accordingly, the total resistances Z of the first to fourth magnetoresistance elements A1, A2, A3, and A4 in a state of zero magnetic field is set to the medium value Zmid.

The magnetization directions α of the corresponding pinned layers 22 may be oriented in the rotation direction ra2. Furthermore, the magnetization directions β0 of the corresponding pinned layers 22 may be oriented in the second direction (the direction Z1), which is a direction 180 degrees opposite to the first direction. In this embodiment, an arrangement pitch of the magnetoresistance elements A1, A2, A3, and A4, which is a distance of the magnetoresistance elements A1, A2, A3, and A4 in the rotation direction, is set to a pitch the same as the pitch λ of the magnetic poles.

FIG. 6 is a view of a circuit configuration of a detection section of the magnetic encoder.

As shown in FIG. 6, in a detection section 30 of the magnetic encoder, regarding the first to fourth magnetoresistance elements A1, A2, A3, and A4, the magnetoresistance elements A1 and A4, which are positioned on edges in the rotation direction, are connected in series via a connection unit T1. the remaining magnetoresistance elements A2 and A3 are connected in series via a connection unit T2.

One end of the first magnetoresistance element A1 and one end of the second magnetoresistance element A2 are connected to a power supply 31 that supplies a voltage Vcc. One end of the fourth magnetoresistance element A4 and one end of the third magnetoresistance element A3 are grounded to the GND. In other words, the first to fourth magnetoresistance elements A1, A2, A3, and A4 form a bridge circuit. A wire is connected to a portion between the first magnetoresistance element A1 and the fourth magnetoresistance element A4, which are connected in series. Another wire is connected to a portion between the second magnetoresistance element A2 and the third magnetoresistance element A3, which are connected in series. In the detection section 30, a first detection voltage V1 and a second detection voltage V2 are output from the first and second connection units T1 and T2, respectively.

Binarization units 32A and 32B are provided downstream of the first and second connection units T1 and T2, respectively. By performing comparison processes on the first and second detection voltages V1 and V2, the binarization units 32A and 32B convert the first and second detection voltages V1 and V2 to an A-phase signal Sa and a B-phase signal Sb that are pulse signals, respectively.

An operation of the magnetic encoder according to the present invention will be described below.

An operation of the magnetic encoder according to the present invention will be described below.

FIGS. 7A to 7E are plan views showing the relationship between the magnetic code and the magnetoresistance elements as one example of an operation state of the magnetic encoder. FIG. 7A illustrates ST1, which is an initialization state of the magnetic encoder. FIG. 7B illustrates ST2, which is a state in which the magnetic body 11 is rotated by only a pitch of λ/2 in the rotation direction ra1 from ST1 that is the initialization state. FIG. 7C illustrates ST3, which is a state in which the magnetic body 11 is further rotated by only a pitch of λ/2 in the rotation direction ra1 from ST2. FIG. 7D illustrates ST4, which is a state in which the magnetic body 11 is further rotated by only a pitch of λ/2 in the rotation direction ra1 from ST3. FIG. 7E illustrates ST5, which is a state in which the magnetic body 11 is further rotated by only a pitch of λ/2 in the rotation direction ra1 from ST4. ST represents STEP. Additionally, FIG. 8A is a graph showing the relationship between the first detection voltage V1 and the A-phase signal Sa. FIG. 8B is a graph showing the relationship between the second detection voltage V2 and the B-phase signal Sb. ST represents STEP. FIGS. 8A and 8B illustrate a case in which the magnetic body is rotated by only an angle corresponding to a pitch of λ2, for example, N→S→N (or S→N→S).

When the rotation shaft 12a is rotated in the rotation direction ra1 or ra2, the rotation body 12 including the magnetic body 11 is rotated. In this case, because the sensor board 20 is disposed at the side of the outer peripheral side surface 11A of the magnetic body 11 so as to face the magnetic body 11, the plurality of N and S poles, which form the magnetic code, pass the front of the sensor board 20 in the rotation direction.

At the side of the outer peripheral side surface 11A of the magnetic body 11, a large number of lines of magnetic force are generated between one N pole and one S pole adjacent to each other as shown in FIG. 4, and the lines of magnetic force have a direction from the N pole to the S pole. Accordingly, a plurality of lines m of magnetic force are generated between the N and S poles that are adjacent to one another. One portion of the lines m of magnetic force reaches the side of the outer peripheral side surface 11A.

As shown in FIG. 7A, from among the plurality of lines m of magnetic force, which are generated between the N and S poles that are adjacent to one another in the rotation direction, typical lines of magnetic force are denoted by m1a, m1b, m2a, m2b, and m3a. In other words, a line of magnetic force that extends from an N1 pole to an S1 pole is denoted by m1a. A line of magnetic force that extends from an N1 pole to an S2 pole is denoted by m1b. A line of magnetic force that extends from an N2 pole to an S2 pole is denoted by m2a. A line of magnetic force that extends from an N2 pole to an S3 pole is denoted by m2b. In this case, at positions at the side of the outer peripheral side surface 11A of the magnetic body 11, the line m1a of magnetic force and the line m2a of magnetic force are oriented in the same direction, i.e., the rotation direction ra1. The line m1b of magnetic force and the line m2b of magnetic force are oriented in the same direction, i.e., the rotation direction ra2. However, the line m1a of magnetic force and the line m1b of magnetic force are oriented in directions opposite to each other. The line m2a of magnetic force and the line m2b of magnetic force are oriented in directions opposite to each other. In other words, at the positions at the side of the outer peripheral side surface 11A of the magnetic body 11, the lines of magnetic force that are oriented alternately in opposite directions are generated between the N and S poles that are adjacent to one another in the rotation direction.

As shown in FIGS. 7A to 7D, when the magnetic body 11 is rotated, the line m1a of magnetic force, the line m1b of magnetic force, the line m2a of magnetic force, the line m2b of magnetic force, and so forth, which are generated from the magnetic body 11 toward the side of the outer periphery of the magnetic body 11, sequentially intersect the first to fourth magnetoresistance elements A1, A2, A3, and A4.

In FIGS. 7A to 7D, the magnetization directions α of the pinned layers 22 of the individual magnetoresistance elements are set to be in the rotation direction ra1.

In ST1 shown as the initialization state in FIG. 7A, the line m1a of magnetic force intersects the first magnetoresistance element A1. The line m1b of magnetic force intersects the second magnetoresistance element A2. The line m2a of magnetic force intersects the third magnetoresistance element A3. The line m2b of magnetic force intersects the fourth magnetoresistance element A4. In this case, external magnetic fields in the rotation direction ra1 influence the first and third magnetoresistance elements A1 and A3, and external magnetic fields in the rotation direction ra2 influence the second and fourth magnetoresistance elements A2 and A4.

Accordingly, as shown in FIG. 7A, the magnetization directions β of the free layers 24 of the first and third magnetoresistance elements A1 and A3 are oriented in the rotation direction ra1. The magnetization directions β of the free layers 24 of the second and fourth magnetoresistance elements A2 and A4 are oriented in the rotation direction ra2. In this case, the magnetization directions β of the free layers 24 of the first and third magnetoresistance elements A1 and A3 are set to be in a direction the same as the magnetization directions α of the corresponding pinned layers 22 (a relationship in which the difference is zero degrees). Accordingly, the total resistances Z of the first and third magnetoresistance elements A1 and A3 are set to the minimum value Zmin.

Furthermore, the magnetization directions β of the free layers 24 of the second and fourth magnetoresistance elements A2 and A4 are set to be in a direction opposite to the magnetization directions α of the corresponding pinned layers 22 (a relationship in which the difference is 180 degrees). Accordingly, the total resistances Z of the second and fourth magnetoresistance elements A3 and A4 are set to the maximum value Zmax.

ST2 shown in FIG. 7B is a state in which the magnetic body 11 is rotated by only a pitch of λ/2, which corresponds to half the pitch (the arrangement pitch) of the magnetic poles, in the rotation direction ra1.

In ST2, for example, only a vertical element influences the first magnetoresistance element A1. Accordingly, a horizontal element that influences A1 becomes substantially zero (zero magnetic field). Similarly, horizontal elements of external magnetic fields that influence the second to fourth magnetoresistance elements A2, A3 and A4 become substantially zero (zero magnetic field). In this case, the magnetization directions β of the free layers 24 of the first to fourth magnetoresistance elements A1, A2, A3, and A4 are retained in the initial magnetization direction β0, i.e., in the first direction (the direction Z2), which is perpendicular to the magnetization directions α of the pinned layers 22. All of the total resistances of the first to fourth magnetoresistance elements A1, A2, A3, and A4 are set to the medium value Zmid.

ST3 shown in FIG. 7C is a state in which the magnetic body 11 is further rotated by only a pitch of λ/2 (a total pitch of the magnetic poles is λ) in the rotation direction ra1.

In ST3, the line m1b of magnetic force intersects the first magnetoresistance element A1. The line m2a of magnetic force intersects the second magnetoresistance element A2. The line m2b of magnetic force intersects the third magnetoresistance element A3. The line m3a of magnetic force intersects the fourth magnetoresistance element A4. Accordingly, external magnetic fields in the rotation direction ra2 influence the first and third magnetoresistance elements A1 and A3, and external magnetic fields in the rotation direction ra1 influence the second and fourth magnetoresistance elements A2 and A4. Thus, the magnetization directions β of the free layers 24 of the first and third magnetoresistance elements A1 and A3 are oriented in a direction opposite to the magnetization directions α of the corresponding pinned layers 22. The total resistances of the first and third magnetoresistance elements A1 and A3 are set to the maximum value Zmax.

In contrast, the magnetization directions β of the free layers 24 of the second and fourth magnetoresistance elements A2 and A4 are oriented in a direction the same as the magnetization directions α of the corresponding pinned layers 22. Accordingly, the total resistances of the second and fourth magnetoresistance elements A2 and A4 are set to the minimum value Zmin.

ST4 shown in FIG. 7D is a state in which the magnetic body 11 is further rotated by only a pitch of λ/2 (the total pitch of the magnetic poles is 3λ/2) in the rotation direction ra1.

ST4 is a state substantially the same as ST2. In this case, the magnetization directions β of the free layers 24 of the first to fourth magnetoresistance elements A1, A2, A3, and A4 are retained in the initial magnetization direction β0, i.e., in the first direction (the direction Z2), which is perpendicular to the magnetization directions α of the pinned layers 22. Accordingly, all of the total resistances of the first to fourth magnetoresistance elements A1, A2, A3, and A4 are set to the medium value Zmid.

ST5 shown in FIG. 7E is a state in which the magnetic body 11 is further rotated by only a pitch of λ/2 (the total pitch of the magnetic poles is 2λ) in the rotation direction ra1.

ST5 is a state substantially the same as ST1. In other words, the line m2a of magnetic force that extends in the rotation direction ra1 intersects the first magnetoresistance element A1. The line m2b of magnetic force that extends in the rotation direction ra2 intersects the second magnetoresistance element A2. The line m3a of magnetic force that extends in the rotation direction ra2 intersects the third magnetoresistance element A3. The line m3b of magnetic force that extends in the rotation direction ra2 intersects the fourth magnetoresistance element A4. Accordingly, as in the case of ST1, the total resistances Z of the first and third magnetoresistance elements A1 and A3 are set to the minimum value Zmin. The total resistances Z of the second and fourth magnetoresistance elements A3 and A4 are set to the maximum value Zmax As described above, when the magnetic body 11 is rotated by only the pitch λ of the magnetic poles, for example, ST1→ST2→ST3→ST4→ST5, the resistances of the first to fourth magnetoresistance elements A1, A2, A3, and A4, and the first and second detection voltages V1 and V2 that are output from the detection section 30 of the magnetic encoder change as shown in Table 1.

[Table 1]

TABLE 1

| | A1 | A2 | A3 | A4 | First Detection Voltage V1 | Second Detection Voltage V2 |
|---|---|---|---|---|---|---|
| ST1 | Zmin | Zmax | Zmin | Zmax | $\dfrac{Z\min}{Z\min + Z\max}V_{cc}$ | $\dfrac{Z\max}{Z\min + Z\max}V_{cc}$ |
| ST2 | Zmid | Zmid | Zmid | Zmid | $\dfrac{V_{cc}}{2}$ | $\dfrac{V_{cc}}{2}$ |
| ST3 | Zmax | Zmin | Zmax | Zmin | $\dfrac{Z\max}{Z\min + Z\max}V_{cc}$ | $\dfrac{Z\min}{Z\min + Z\max}V_{cc}$ |
| ST4 | Zmid | Zmid | Zmid | Zmid | $\dfrac{V_{cc}}{2}$ | $\dfrac{V_{cc}}{2}$ |
| ST5 | Zmin | Zmax | Zmin | Zmax | $\dfrac{Z\min}{Z\min + Z\max}V_{cc}$ | $\dfrac{Z\max}{Z\min + Z\max}V_{cc}$ |

When the horizontal axis indicates pitch and the vertical axis indicates voltage, the first and second detection voltages V1 and V2 are plotted as shown in FIGS. 8A and 8B.

As shown in FIGS. 8A and 8B, in the magnetic encoder 10 according to the present invention, by rotating the magnetic body 11 by only a rotation angle (an electrical angle of 360 degrees) that corresponds to twice the pitch λ of the magnetic poles, the first and second detection voltages V1 and V2 can be output for one period of the first and second detection voltages V1 and V2.

In other words, when the magnetic body 11 is rotated by an angle corresponding to a pitch of the magnetic poles of 2λ (an electrical angle of 360 degrees), for example, N→S→N (or S→N→S), the first and second detection voltages V1 and V2 can be obtained for one period of the first and second detection voltages V1 and V2.

As shown in FIGS. 7A to 7D, in the operation in ST1 to ST5, in which the magnetic body 11 is rotated by only a pitch of 2λ (an electrical angle of 360 degrees), the magnetization directions β of the free layers 24 of the first to fourth magnetoresistance elements A1, A2, A3, and A4 are changed by 360 degrees. In the operation, the total resistances Z of the first to fourth magnetoresistance elements A1, A2, A3, and A4 range from the minimum value Zmin to the maximum value Zmax (see Table 1).

In this case, a division ratio of resistances in the bridge circuit that is included in the detection section 30 ranges from the minimum division ratio (Zmin/(Zmin+Zmax)) to the maximum division ratio (Zmax/(Zmin+Zmax)). Accordingly, as shown in FIGS. 8A and 8B, the maximum amplitudes (the full swings) of the first and second detection voltages V1 and V2, which are output from the first and second connection units T1 and T2 serving as output units of the bridge circuit, respectively, can be obtained.

Thus, in the binarization units 32A and 32B, even when small external noise influences the binarization units 32A and 32B, the first and second detection voltages V1 and V2 can be can be digitized using a predetermined threshold voltage Vth (Vcc/2 in FIGS. 8A and 8B) to obtain the A-phase signal and the B-phase signal. Therefore, the magnetic encoder having a strong resistance to noise can be provided.

As shown in FIGS. 8A and 8B, when the pitch λ of the magnetic poles, which are the N and S poles adjacent to one another, corresponds to an electrical angle of 180 degrees, the A-phase signal Sa and the B-phase signal Sb are pulse signals having a phase difference of 90 degrees. Either of the A-phase signal Sa and the B-phase signal Sb serves as a leading signal that leads the other signal depending on whether the rotation direction of the magnetic body 11 is the rotation direction ra1 or ra2. In other words, for example, when the rotation direction of the magnetic body 11 is the rotation direction ra1, the A-phase signal Sa is output as a leading signal. When the rotation direction is the rotation direction ra2, the B-phase signal Sb is output as a leading signal. Accordingly, the rotation direction of the magnetic body 11, i.e., a rotation direction of the rotation shaft 12a, can be detected from the A-phase signal Sa and the B-phase signal Sb.

FIG. 9 is a schematic plan view of a magnetic encoder in which four types of signals are output, and is similar to FIG. 7A.

In this case, the four types of signals are the A-phase signal Sa, the B-phase signal Sb, an A-phase-bar signal Sa- whose phase is 90 degrees (180 degrees in a case in which a pitch of the magnetic poles of 2λ corresponds to an electrical angle of 360 degrees) different from that of the A-phase signal Sa, and a B-phase-bar signal Sb- whose phase is 90 degrees (180 degrees in a case in which a pitch of the magnetic poles of 2λ corresponds to an electrical angle of 360 degrees) different from that of the B-phase signal Sb.

In the magnetic encoder shown in FIG. 9, the first to fourth magnetoresistance elements A1, A2, A3, and A4 that output the A-phase signal, and the fifth to eighth magnetoresistance elements B1, B2, B3, and B4 that output the B-phase signal, i.e., eight magnetoresistance elements in total, are provided along the rotation direction in one line on one sensor board 20.

The fifth magnetoresistance element B1 is provided between the first and second magnetoresistance elements A1 and A2. The sixth magnetoresistance element B2 is provided between the second and third magnetoresistance elements A2 and A3. The seventh magnetoresistance element B3 is provided between the third and fourth magnetoresistance elements A3 and A4. The eighth magnetoresistance element B4 is provided in such a manner that the fourth magnetoresistance element A4 is positioned between the seventh and eighth magnetoresistance elements B3 and B4.

An arrangement pitch of the same type of magnetoresistance elements, such as the first to fourth magnetoresistance elements A1, A2, A3, and A4 for the A-phase signal, and the fifth to eighth magnetoresistance elements B1, B2, B3, and B4 for the B-phase signal, is set to λ as in the above-described case. An arrangement pitch of different types of magnetoresistance elements that are adjacent to one another in the rotation direction, such as the first and fifth magnetoresistance elements A1 and B1, and the fifth and second magnetoresistance elements B1 and A2, is set to λ/2.

Accordingly, the detection section 30 shown in FIG. 6 is applied to the first to fourth magnetoresistance elements A1, A2, A3, and A4, and is also applied to the fifth to eighth magnetoresistance elements B1, B2, B3, and B4. In other words, a first detection section is configured using the first to fourth magnetoresistance elements A1, A2, A3, and A4 to obtain the A-phase signal and the B-phase signal Sb. Similarly, a second detection section is configured using the fifth to eighth magnetoresistance elements B1, B2, B3, and B4 to obtain the A-phase-bar signal Sa- and the B-phase-bar signal Sb-.

In the above-described embodiments, magnetoresistance elements having the same configuration (magnetoresistance elements in which the magnetization directions α of the pinned layers 22 are oriented in the same direction and in which the bias magnetic fields γ are oriented in the same direction) can be used as all of the plurality of magnetoresistance elements that are disposed on the sensor board 20.

More particularly, a large number of magnetoresistance elements that are formed on the same wafer have the same configuration. Accordingly, four magnetoresistance elements or eight magnetoresistance elements may be cut out together as one group from among the large number of magnetoresistance elements, and the sensor board 20 can be configured using the magnetoresistance elements that are cut out. Thus, in the case of the magnetic encoder 10 according to the present invention, it is unnecessary that individual magnetoresistance elements be separately cut out, that the magnetization directions of the magnetoresistance elements be aligned in the same direction, and that the magnetoresistance elements be fixed on the sensor board 20. Therefore, an assembly process can be easily performed.

In the above-described embodiments, both the magnetization directions α of the pinned layers 22 of the individual magnetoresistance elements and the directions of the bias magnetic fields γ of the individual magnetoresistance elements are set to be in the first direction (the direction Z2) that is parallel to the outer peripheral side surface 11A and that is perpendicular to the rotation directions (ra1-ra2). The present invention is not limited thereto. The second direction (the direction Z1) opposite to the first direction may be used.

In the above description, the magnetization directions α of the pinned layers 22 and the directions of the bias magnetic fields γ are oriented in the same direction. However, the magnetization directions α of the pinned layers 22 and the directions of the bias magnetic fields γ may be set to be in different directions.

BRIEF DESCRIPTION OF THE DRAWINGS

FIG. 7B is an illustration of ST2 in which the magnetic body is rotated by only a pitch of λ/2 in a rotation direction ra1 from ST1 that is the initialization state.

Figure 1:
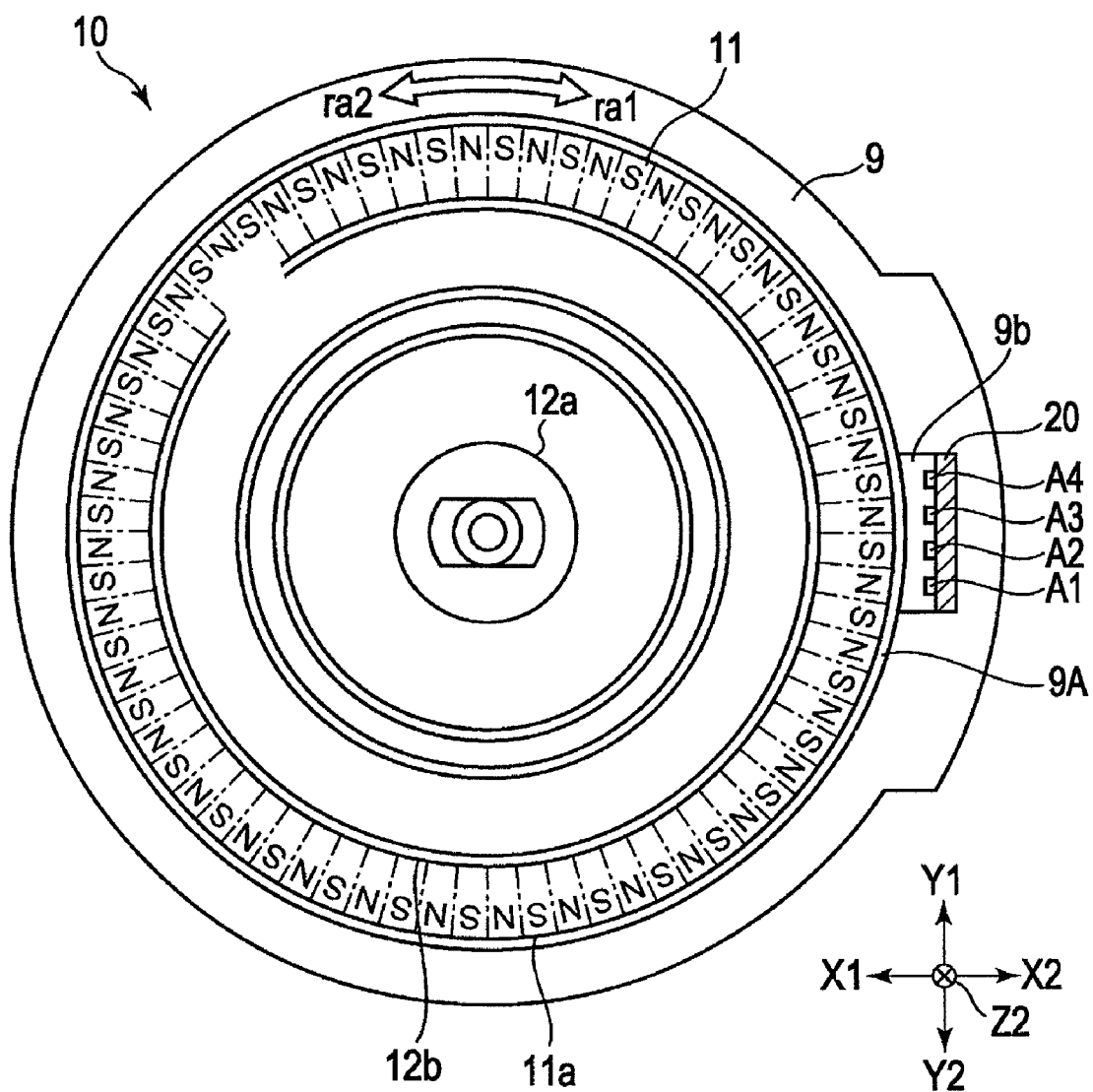
FIG. 1 is a plan view of a magnetic encoder according to an embodiment of the present invention.
Figure 2:
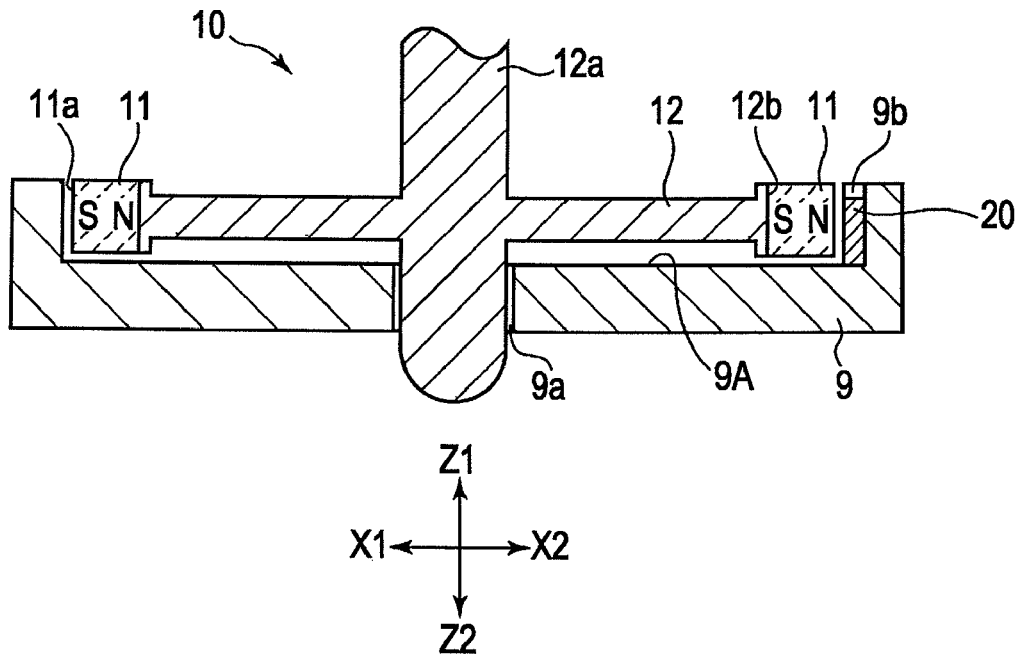
FIG. 2 is a sectional view of the magnetic encoder shown in FIG. 1.
Figure 3:
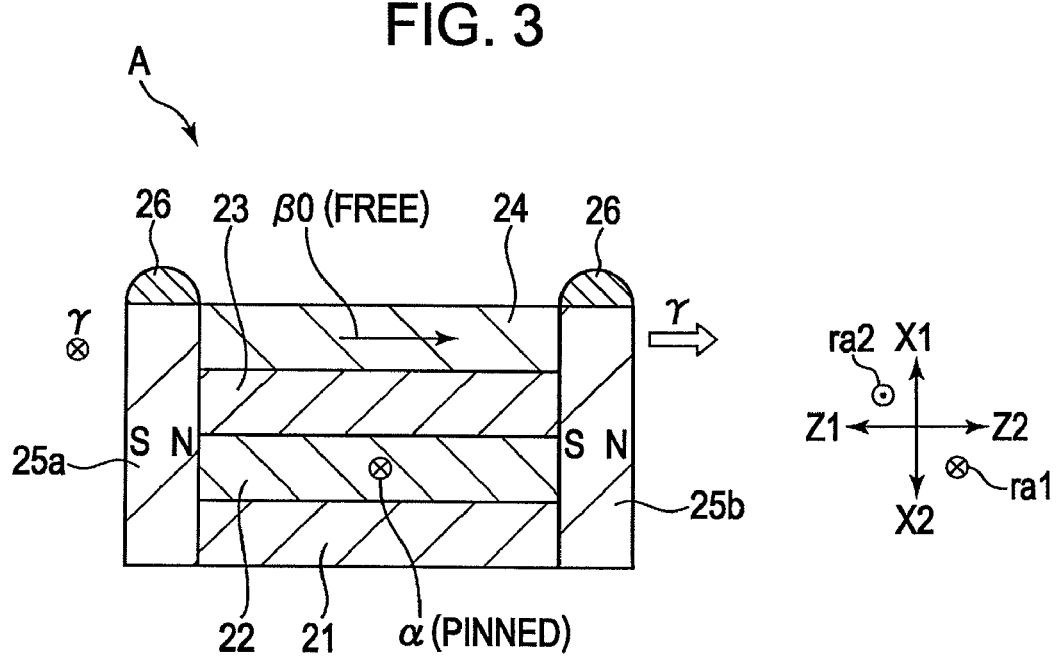
FIG. 3 is a schematic sectional view of a basic configuration of a multilayer magnetoresistance element.
Figure 4:
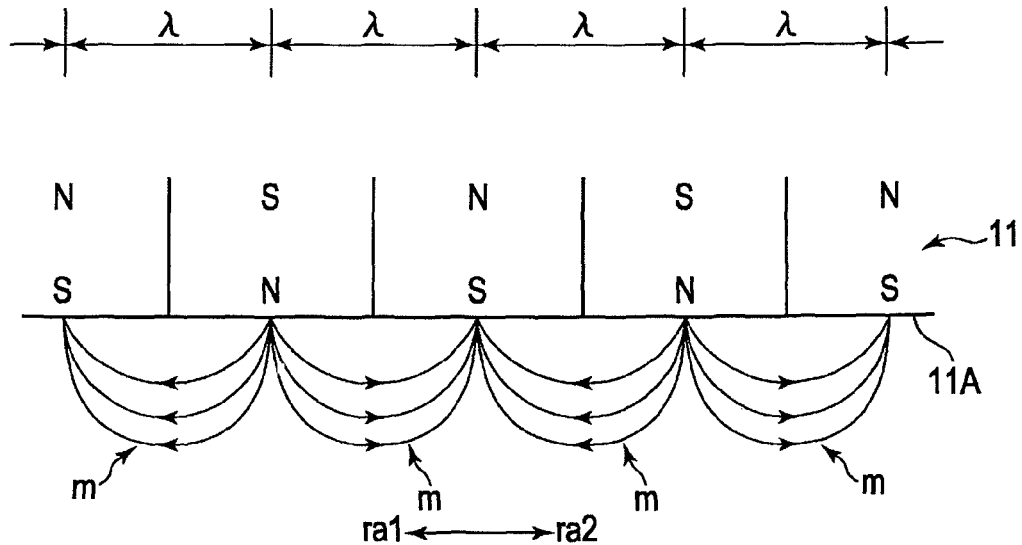
FIG. 4 is a partially enlarged plan view of a magnetic code formed on an outer peripheral side surface of a magnetic body.
Figure 5:
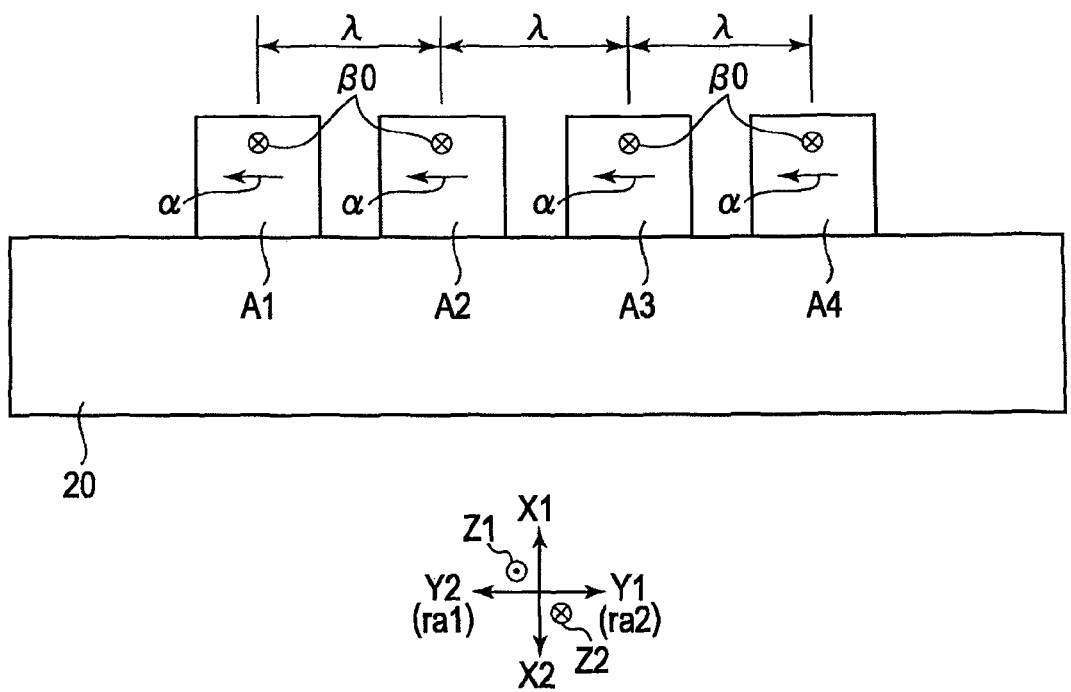
FIG. 5 is a plan view of a sensor board on which magnetoresistance elements are formed.
Figure 6:
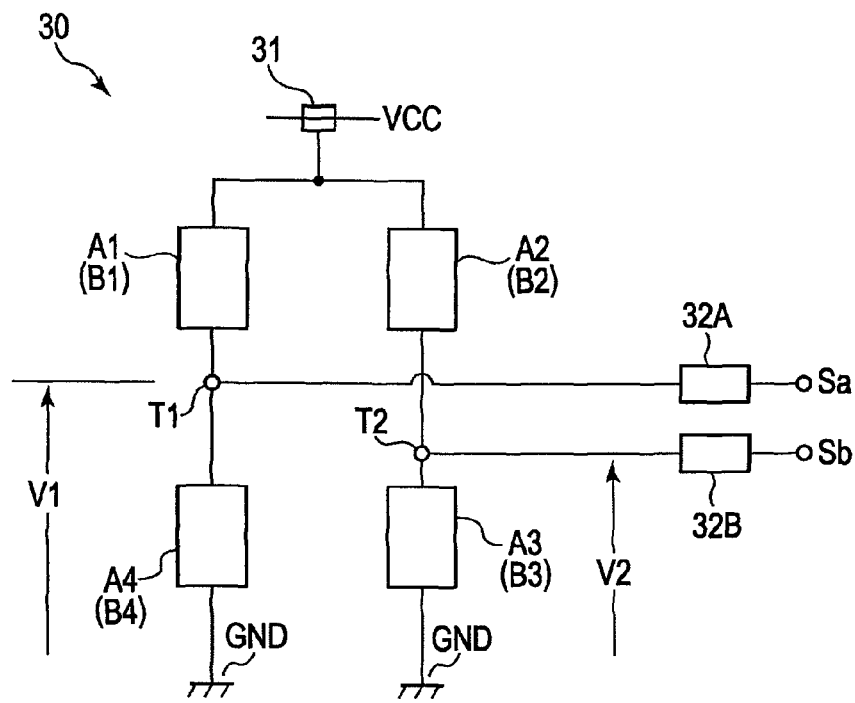
FIG. 6 is a view of a circuit configuration of a detection section of the magnetic encoder.
Figure 7A:
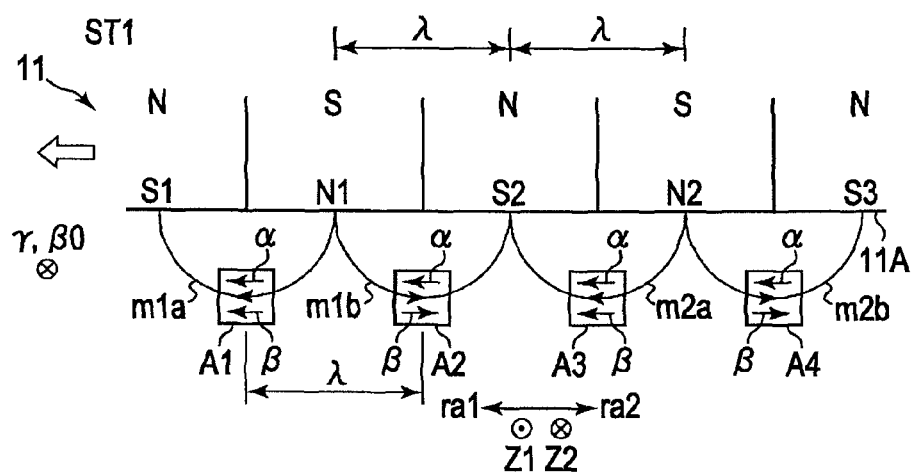
FIG. 7A is an illustration of ST1 that is an initialization state of the magnetic encoder.
Figure 7C:
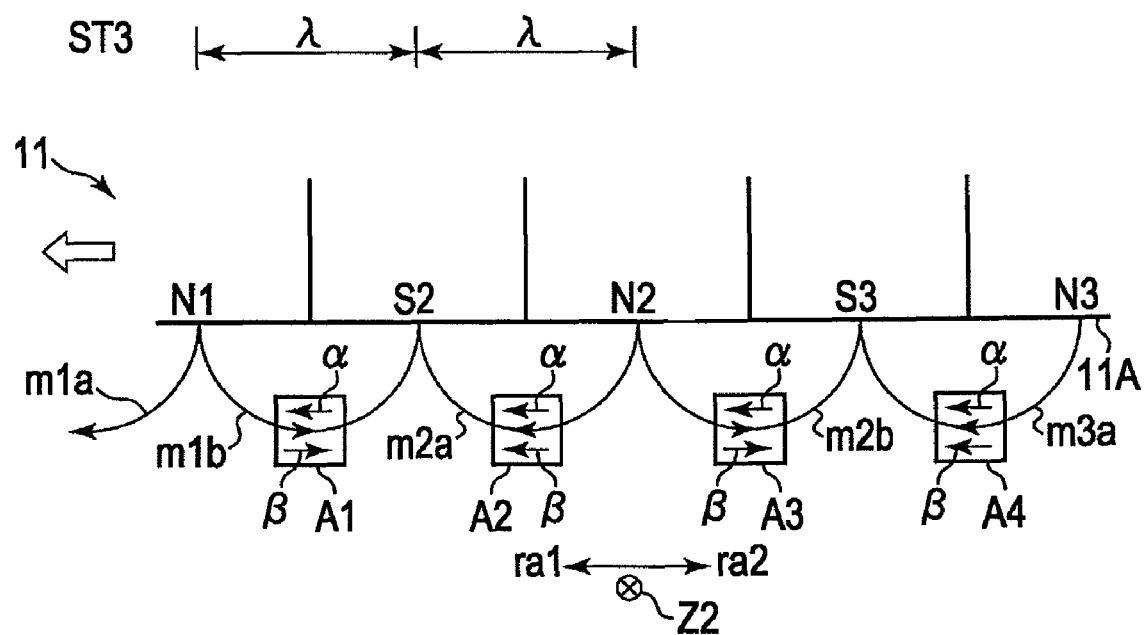
FIG. 7C is an illustration of ST3 in which the magnetic body is rotated by only a pitch of λ/2 in the rotation direction ra1 from ST2.
Figure 7D:
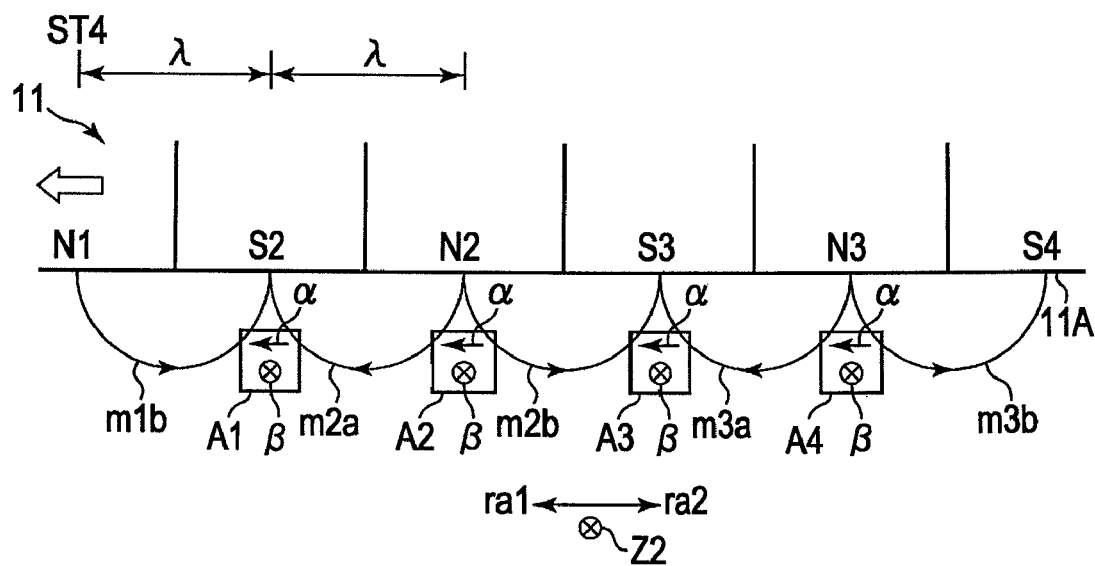
FIG. 7D is an illustration of ST4 in which the magnetic body is rotated by only a pitch of λ/2 in the rotation direction ra1 from ST3.
Figure 7E:
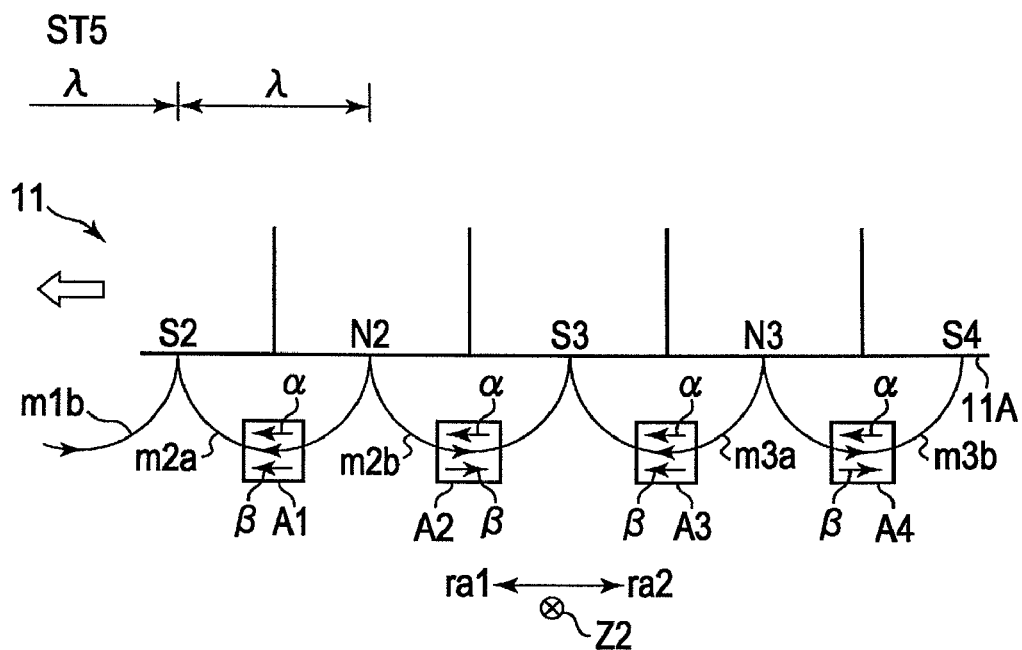
FIG. 7E is an illustration of ST5 in which the magnetic body is rotated by only a pitch of λ/2 in the rotation direction ra1 from ST4.
Figure 8A:
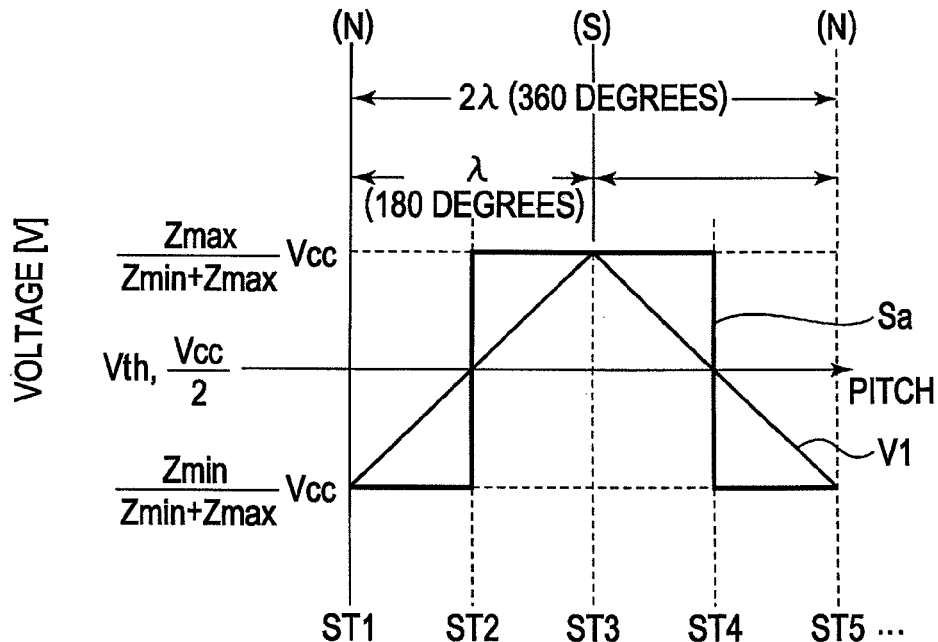
FIG. 8A is a graph showing the relationship between first detection voltage V1 and A-phase signal Sa.
Figure 8B:
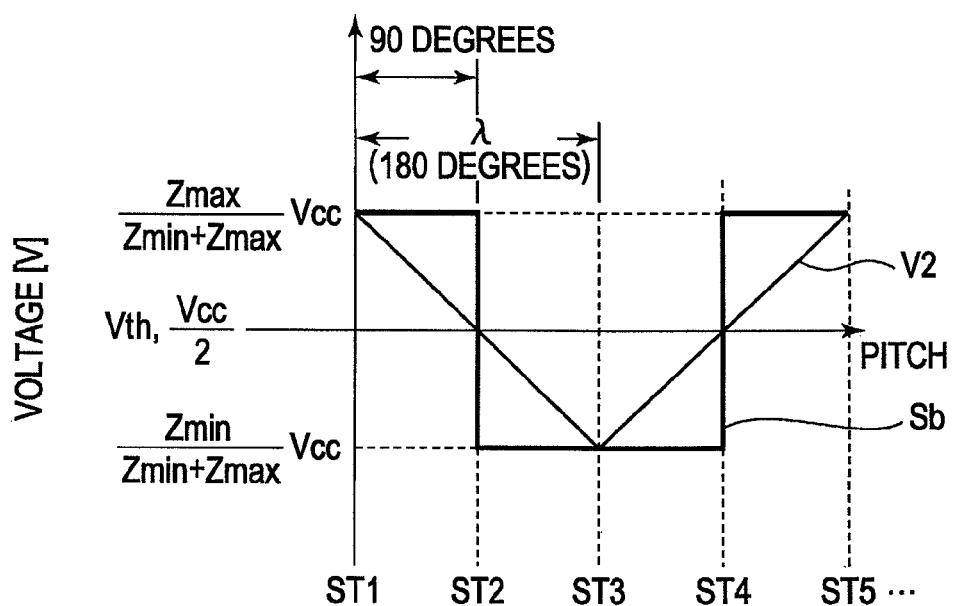
FIG. 8B is a graph showing the relationship between second detection voltage V2 and B-phase signal Sb.
Figure 9:
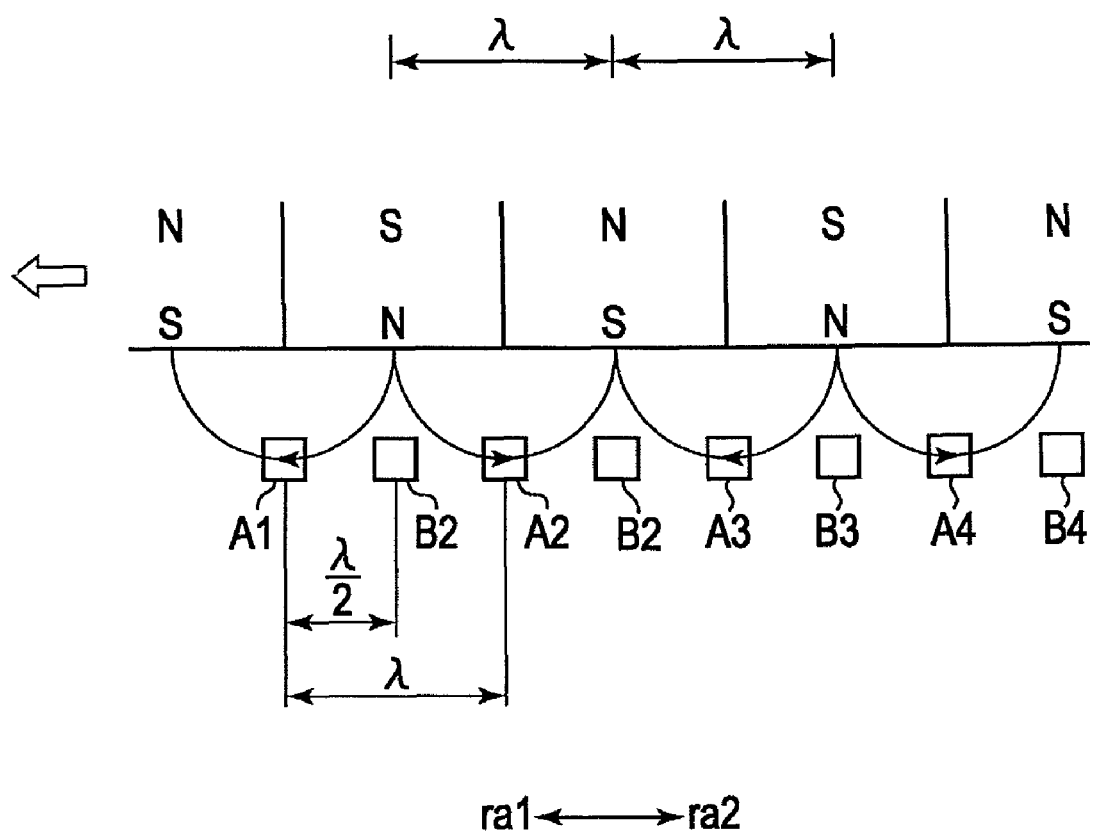
FIG. 9 is a schematic illustration of the magnetic encoder in which four types of signals are output, and is similar to FIG. 7A.

REFERENCE NUMERALS 9 housing
9b cut portion
9A recessed portion
10 magnetic encoder
11 magnetic body
11A outer peripheral side surface
12 rotation body
12a rotation shaft
20 sensor board
21 antiferromagnetic layer (exchange bias layer)
22 pinned layer (fixed layer)
23 non-magnetic layer
24 free layer
25a, 25b hard bias layers
26, 26 terminal units
30 detection section
31 power supply
32A, 32B binarization units
A magnetoresistance element
A1, A2, A3, A4 first to fourth magnetoresistance elements
B1, B2, B3, B4 fifth to eighth magnetoresistance elements
N, S magnetic poles (magnetic code) polarized on outer peripheral side surface of magnetic body
Sa A-phase signal
Sb B-phase signal
V1 first detection voltage
V2 second detection voltage
m1a, m1b, m2a, m2b typical lines of magnetic force
ra1, ra2 rotation directions
α magnetization direction of pinned layer
β magnetization direction of free layer
γ bias magnetic field

The invention claimed is:

1. A magnetic encoder comprising: a rotation body that is rotatably supported; a magnetic body including a plurality of magnetic poles that are alternately polarized as N poles and S poles along a rotation direction on an outer peripheral side surface of the rotation body; and a plurality of magnetoresistance elements that are disposed along the rotation direction in the vicinity of the magnetic body so as to face the magnetic body, wherein each of the plurality of magnetoresistance elements includes at least a pinned layer, and a free layer in which an internal magnetization direction changes in accordance with external magnetic fields emitted by the magnetic body, a magnetization direction of the pinned layer is set to be in the rotation direction, and an initial magnetization direction of the free layer is set to be in a direction that is parallel to the outer peripheral side surface and that is perpendicular to the rotation direction, wherein a pitch of the N poles and the S poles that are adjacent to one another in the rotation direction and an arrangement pitch of the plurality of magnetoresistance elements are set to the same pitch, and wherein each of the plurality of magnetoresistance elements includes, in addition to the pinned layer and the free layer, an antiferromagnetic layer that pins the magnetization direction of the pinned layer in a predetermined direction, and hard bias layers that provide a bias magnetic field which sets the initial magnetization direction of the free layer to be in a reference direction, the hard bias layers being disposed at both sides of the pinned layer and the free layer.

2. The magnetic encoder according to claim 1, wherein a detection section is provided, the detection section including, when the pitch of the plurality of magnetic poles is denoted by $\lambda$, four magnetoresistance elements, namely, first to fourth magnetoresistance elements, that are disposed in such a manner that the arrangement pitch is $\lambda$, a first connection unit that is used to connect two magnetoresistance elements which are the first and fourth magnetoresistance elements in series, a second connection unit that is used to connect two magnetoresistance elements which are the second and third magnetoresistance elements in series, and a power supply that applies a predetermined voltage between ends of the first and second magnetoresistance elements and ends of the third and fourth magnetoresistance elements, a first detection voltage being output from the first connection unit, a second detection voltage being output from the second connection unit.

3. The magnetic encoder according to claim 2, wherein, in contrast to the first detection section configured using the first to fourth magnetoresistance elements that are disposed using the arrangement pitch of $\lambda$, a second detection section is provided, the second detection section being configured using fifth to eighth magnetoresistance elements that are disposed using the arrangement pitch of $\lambda$ which is used for the first to fourth magnetoresistance elements, and wherein each of the magnetoresistance elements that are the fifth to eighth magnetoresistance elements is disposed between corresponding ones of the magnetoresistance elements that are the first to fourth magnetoresistance elements, and a distance of the magnetoresistance elements adjacent to one another is set to a pitch of $\lambda/2$.

\* \* \* \* \*